(12) United States Patent
Thebeau et al.

(10) Patent No.: US 6,483,271 B1
(45) Date of Patent: Nov. 19, 2002

(54) MOTOR DRIVE PARAMETERS

(75) Inventors: Ronnie E. Thebeau, Middletown, CT (US); Daryl J. Marvin, Farmington, CT (US); Christopher S. Czerwinski, Middletown, CT (US); Neil A. Greiner, Wethersfield, CT (US); Edward D. Piedra, Chicopee, MA (US)

(73) Assignee: Otis Elevator Company, Farmington, CT (US)

( * ) Notice: Subject to any disclaimer, the term of this patent is extended or adjusted under 35 U.S.C. 154(b) by 23 days.

(21) Appl. No.: 09/712,379

(22) Filed: Nov. 14, 2000

(51) Int. Cl.[7] ............................. H02P 5/34; H02P 7/42
(52) U.S. Cl. ................. 318/802; 318/806; 318/471; 318/783
(58) Field of Search ................. 318/802, 803, 318/806, 811, 471, 472, 473, 783

(56) References Cited

U.S. PATENT DOCUMENTS

| | | | | |
|---|---|---|---|---|
| 4,016,459 A | * | 4/1977 | Boehringer | 323/284 |
| 4,378,580 A | * | 3/1983 | Stich | 323/284 |
| 4,542,324 A | * | 9/1985 | Leuthen | 318/798 |
| 5,373,205 A | * | 12/1994 | Busick et al. | 318/434 |
| 5,627,710 A | * | 5/1997 | Schoeffler | 361/23 |
| 5,923,135 A | * | 7/1999 | Takeda | 318/432 |
| 6,111,379 A | * | 8/2000 | Feldtkeller | 318/471 |
| 6,205,010 B1 | * | 3/2001 | Ohsaka et al. | 307/117 |
| 6,285,150 B1 | * | 9/2001 | Adam et al. | 318/471 |

FOREIGN PATENT DOCUMENTS

JP            05252768 A  *  9/1993  ............. H02P/3/08

* cited by examiner

Primary Examiner—Robert E. Nappi
Assistant Examiner—Edgardo San Martin

(57) ABSTRACT

The temperature (25, 33, 43) of solid state switching devices in variable speed motor drives (11, 18), such as elevator motor drives, are utilized to reduce the load on the drive, by reducing the switching frequency (50) or the commanded load (110). The choice between the preferred non-switching zero state and an alternative zero state is determined (60) by temperature (28, 34, 56) of the switched transistor's anti-parallel diode. The rate of recognizing reduced temperatures is limited (33, 34) to avoid motor speed and/or load variations. The temperature may either be measured (24, 27) or determined (70) from models utilizing manufacturer product specification and normalized thermal transient response from the transistor/diode package to a heat sink.

13 Claims, 4 Drawing Sheets

MOTOR DRIVE PARAMETERS

TECHNICAL FIELD

This invention relates to controlling the parameters of a variable speed motor drive in response to the temperature of the solid state switches within the drive.

BACKGROUND ART

Solid state devices used in motor drives, typically insulated gate bipolar transistors (IGBTs) and their anti-parallel diodes, undergo thermal stress as a function of the load on the motor and the switching frequency in the drive. Particularly, thermal differences between the solid state junctions and the thermal sink create mechanical stress and ultimate failure of bonded wires. Exemplary motor drives are disclosed in U.S. patent applications Ser. No. 09/310,393 and Ser. No. 09/310,31 1. Since thermal stress of solid state devices results in failure thereof, drives are typically designed to carry more than the anticipated load so as to reduce the possibility and delay the onset of failure, by reducing thermal stresses which occur during the worst-case drive situations.

The zero state of space vector, zero state, pulse width modulation motor drives is when there is no differential voltage driving the motor (although there may be current flow); then, all upper switches of the matrix are conducting, and all lower switches are off, so all lower diodes are conducting, or vice versa. It is known that transistor switching losses in motor drives are much higher than diode switching losses or conduction losses of either diodes or transistors. Motor drives are conventionally controlled so that the zero state is selected to minimize transistor switching, thereby to reduce losses and thermal stress in the transistors. However, such operation leaves selected diodes in a conducting state for long time segments, which must be accommodated in the design of the motor drive. Although switching losses and therefore device temperatures can be reduced by using lower switching frequencies, such lower switching frequencies produce noise which is objectionable in certain environments, such as elevators.

DISCLOSURE OF INVENTION

Objects of the present invention include avoiding excessive thermal stress in solid state switches utilized in variable speed motor drives; avoiding excessive junction/heatsink (chassis) temperature differentials in such drives; predicting lifetime and failure modes of solid state switches in variable speed motor drives; utilizing variable speed motor drives maximally without creating excessive thermal stresses therein; reducing mechanical failure of bonded wires in such drives; improving variable motor drive operation; and providing variable speed motor drives that can automatically adjust operation to suit various loads and to suit different utilizations.

According to the present invention, the approximate temperatures of solid state switching devices in variable speed motor drives, such as elevator motor drives, including insulated gate bipolar transistors (IGBTs) and diodes, are determined, either by measurement or by estimation; transistor and diode conduction and switching losses, thermal resistance and transient thermal response between each device and the case of each device, and between each case and a thermal sink, as well as normalized case-to-sink transient thermal response, are used to form models of heat flow and temperature as a function of current flowing through the devices, duty cycle of the devices, and device switching frequency. When transistor temperatures exceed a threshold, device operation is altered, such as by lowering the switching frequency or reducing the maximum load, such as by reducing acceleration; when transistor temperatures fall below a threshold, device operation is altered, such as by raising the switching frequency or the maximum load. According further to the invention, the choice between a preferred zero state which does not incur transistor switching losses, and an alternative zero state which will incur transistor switching losses, is made on a time share basis, with the duty cycle of choice for the non-preferred zero state being based upon diode junction temperature. When the highest diode temperature exceeds a threshold, the percent of time in which the zero state involving that diode is selected to be the alternative zero state, in which that diode will not conduct, is increased so as to permit the diode temperature to be lowered; but when that diode temperature falls below the threshold, then the percent of time in which the preferred zero state is selected is increased.

According still further to the invention, the slew rate (rate of change with time) of decreasing temperature, and therefore of increasing switching frequency, maximum load or diode duty cycle, is limited to prevent changes from following motor speed and/or load variations; the slew rate limit may be a function of motor speed; and upper and lower limits may be applied to switching frequency or maximum load and to diode duty cycle. Temperature information may be accumulated over time to predict device life, thereby to permit replacement only as realistically needed. The motor drive can thereby custom design its operating characteristics to suit any utilization to which it is put, e.g., one type of elevator or another type of elevator, as well as to alter its operation on a use-by-use basis so as to suit the duty imposed during each use of the motor, such as each run of an elevator.

In accordance still further with the invention, the alterations to operation described hereinbefore may be proportional to temperature excesses.

Other objects, features and advantages of the present invention will become more apparent in the light of the following detailed description of exemplary embodiments thereof, as illustrated in the accompanying drawing.

MODE(S) FOR CARRYING OUT THE INVENTION

Figure 1:
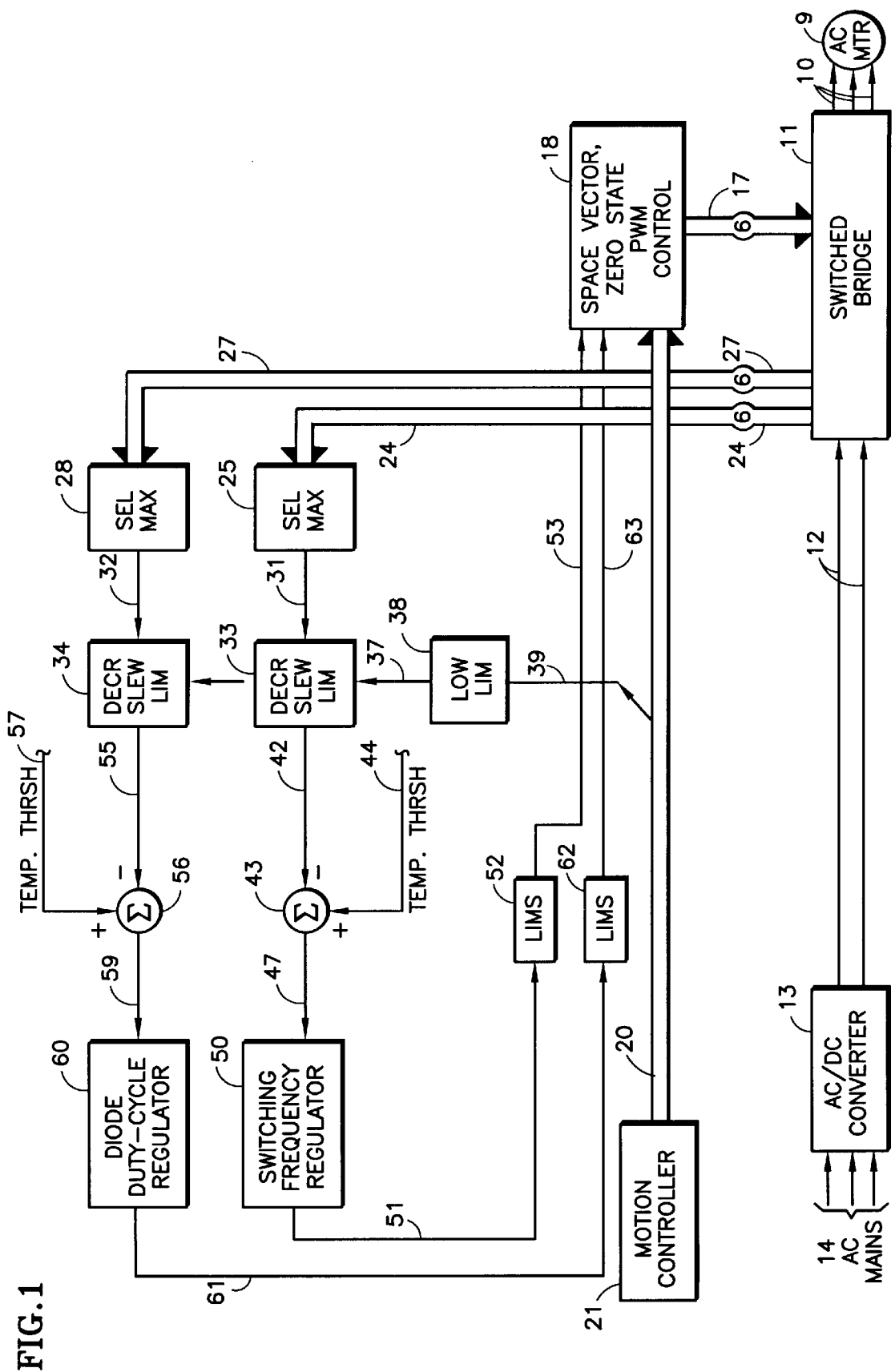
FIG. 1 is a high level functional diagram of an embodiment of the invention which uses measured transistor and diode temperatures to alter the PWM switching frequency and to select zero states.

Referring to FIG. 1, an AC motor 9 (such as an induction motor or a permanent magnet motor) is provided power over lines 10 from a switch bridge 11 which in turn is provided DC power over lines 12 from an AC to DC converter 13, which is powered by AC mains 14. The switch bridge 11 may typically comprise a bridge having six insulated gate bipolar transistors (IGBTs), each with an anti-parallel diode, the operation of which is controlled by six individual switching signals on lines 17 from a space vector, zero state, pulse width modulation (PWM) control 18. The control 18 may be conventional or may take the form of that disclosed in the aforementioned applications. In the exemplary embodiments herein in which the motor 9 is part of an elevator drive, the PWM control 18 will respond to signals on a trunk of lines 20 from a motion controller 21 of any conventional type which determines when the elevator should stop, how it should accelerate and to what speed, and when it should slow down, and so forth. The description thus far is descriptive of a conventional space vector, zero state, pulse width modulation switched bridge motor drive. The functions described hereinafter may either be implemented in hardware or more preferably by software routines in a computer which comprises the PWM control 18, which in turn may be implemented within the motion controller 21, or not.

According to the invention, the temperature of the junction of each transistor is measured by means of a temperature sensor disposed in the case with the transistor and its paired diode, and a signal indicative of the temperature of each is sent over a trunk of lines 24 to a maximum temperature selection function 25, which selects the maximum one of the six transistor temperatures. Similarly, signals indicative of diode junction temperatures are sent over a trunk of lines 27 to a maximum temperature selection function 28 which selects the maximum one of the six diode junction temperatures indicated on lines 27. In order to prevent the operation from changing as a result of temperature changes that oscillate slightly with the motor input electrical frequency, the maximum temperatures on lines 31 and 32 are applied to temperature decrease slew rate limiting functions 33, 34 so that the effect of each temperature on the controller can only decrease at a rate slow enough to avoid having operational changes which become cyclically related to the motor frequency. The slew rate is in turn governed by motor speed in response to a signal on a line 37 from a limiter 38 that responds to a motor speed command signal supplied to the PWM control 18, on one of the lines 39 of the trunk of lines 20. The low limit ensures that there will be a slew rate even when the motor is stopped, such as when an elevator is stopped at a landing. The slew-limited, maximum temperature on line 42 is subtracted in a summer function 43 from a temperature signal on a line 44. A signal on a line 47 will indicate the amount by which the current maximum temperature is above the threshold, if it is. If it is above the threshold, a switching frequency regulator function 50 will cause the commanded switching frequency to be decreased in any case where the maximum transistor junction temperature exceeds the transistor threshold temperature. Whenever operation has been adjusted because of an over-temperature condition, so that the device is operating at a reduced switching frequency, then the signal on line 47 indicates that the maximum transistor junction temperature indicated on line 42 is less than the transistor threshold temperature, and the switching frequency regulator function 50 will command an increase in the switching frequency. The switching frequency command on a line 51 is applied to upper and lower limits 52 and then becomes the switching frequency command on a line 53. The lower limit of the switching frequency prevents the frequency from dropping to levels which can be unpleasant to the ear; the upper limit of switching frequency is to remain within the control capabilities of the drive control algorithms and hardware limitations.

Thus, as the temperature of the transistors increase, the switching frequency regulator function 50 may order a drop in switching frequency, which can be rapid, so long as the frequency does not fall below a lower limit; this will reduce the load on the transistors, thereby allowing them to operate at a lower temperature differential from the sink, which in turn will cause the frequency control to order a higher temperature, which however will be allowed to raise only at the rate of the temperature decrease slew rate function 33, and never increase beyond an upper limit (generally, the desired design operating frequency).

The scheme of zero state control is to choose preferred zero states that do not require the transistors to switch to enter the zero state, unless retaining the same transistors in operation for too long of a time will cause diodes to overheat; in such a case, the chosen zero state is altered from the preferred, transistor protecting zero state, so that the warmest diodes may cool off. The selected duty cycle may initially (and generally) be that in which the preferred zero state will have a duty cycle of 1.0 until any diode becomes too warm; then the duty cycle may reduce so that the preferred zero state is on for a lesser portion of a cycle (for example, 0.8) and the alternative zero state is selected for the remaining portion (for example, 0.2). Once the duty cycle has been commanded to be less than full use of the preferred zero state, the duty cycle command on the line 61 cannot have the preferred zero state portion of each cycle increase more than at a controlled slew rate due to the diode temperature slew rate limit function 34.

The slew rate limited temperature on a line 55 is subtracted in a summer function 56 from a temperature threshold signal on a line 57. If the highest temperature exceeds the threshold, then a signal on a line 59 will cause a duty cycle regulator 60 to select a different zero state, one that requires a transistor to switch, but which will nonetheless allow the warmest diode to cool down. The duty cycle command on a line 61 is passed through upper and lower limit functions 62 to become the zero state command on a line 63, causing the zero state to either be the preferred zero state or the alternative zero state. The lower limit on the duty cycle is to keep it above zero; the upper limit on the duty cycle is to keep it within the control capabilities of the drive control algorithms and hardware limitations. Because the temperatures indicated on the lines 24, 27 are not sensed exactly on the transistor junctions, they may be considered to be approximate temperatures. The regulator functions 50, 60 may be conventional proportional/integral (PI) regulators.

Figure 2:
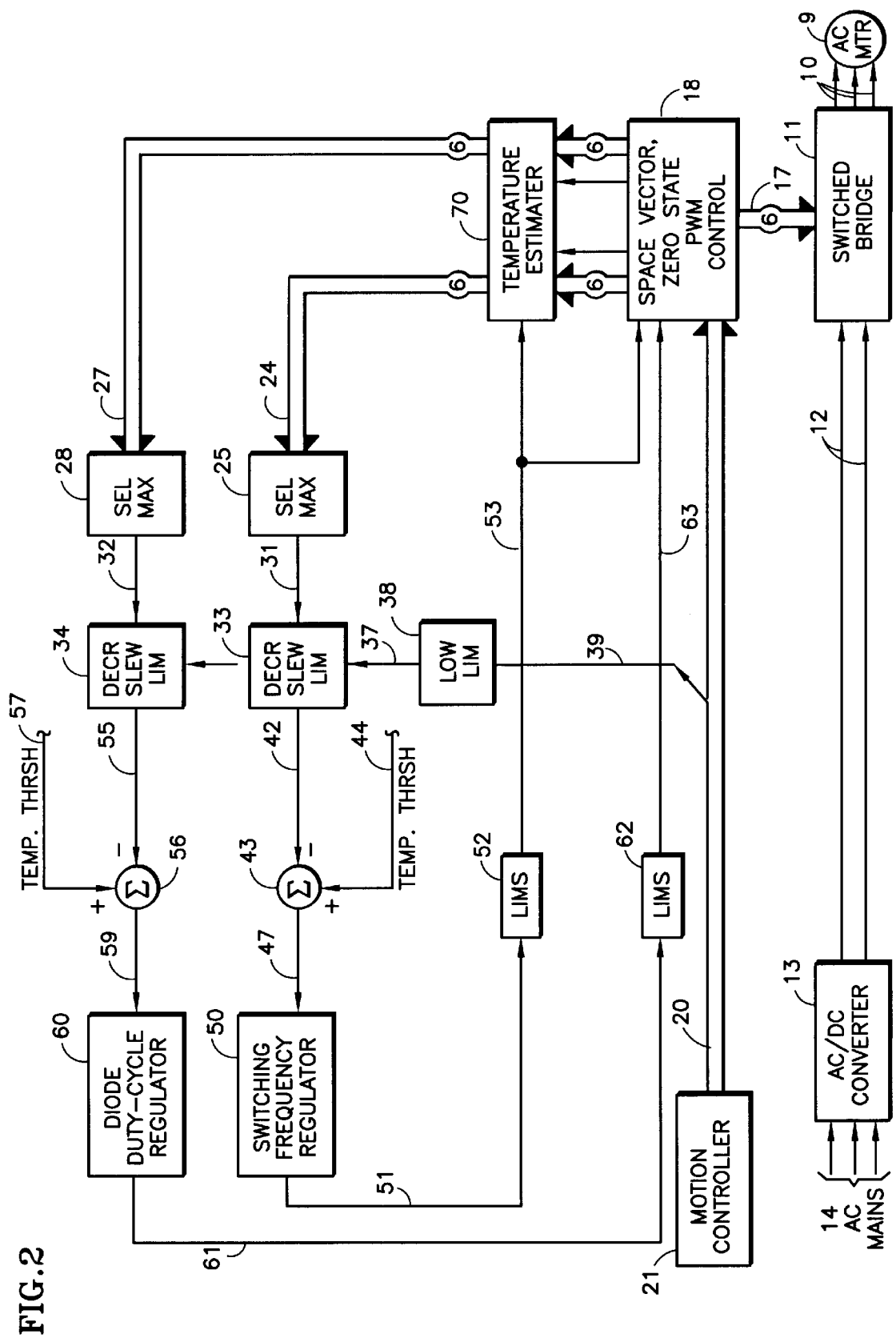
FIG. 2 is a high level functional diagram of an embodiment of the invention which calculates transistor and diode temperatures to alter PWM switching frequency and to select zero states.
Figure 3:
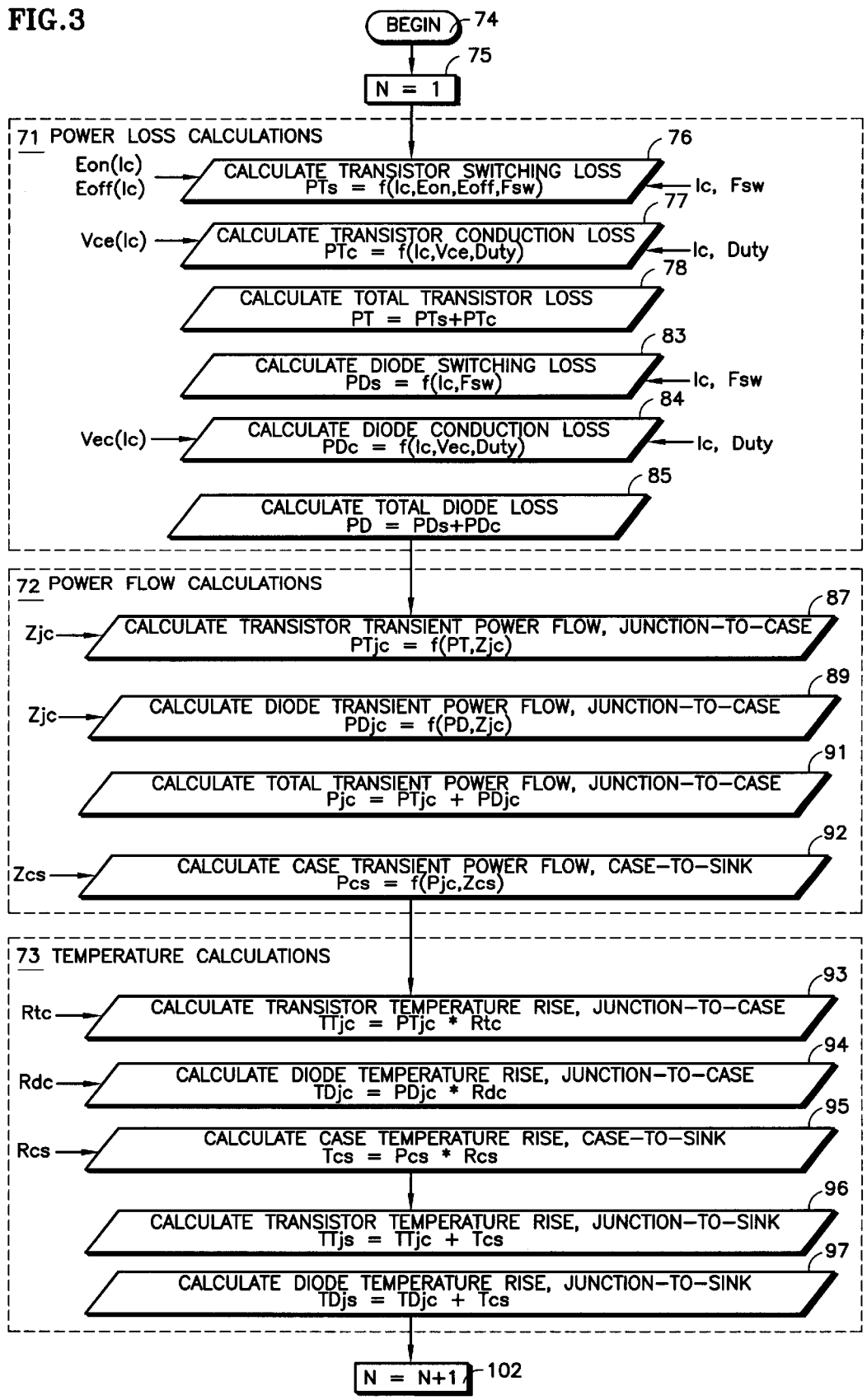
FIG. 3 is a high level function flow diagram of temperature calculations of the invention.

In the embodiment of FIG. 2, instead of measuring temperatures of the transistors and the diodes within the switched bridge 11, a temperature estimator function 70 determines the approximate temperature of each transistor junction as a function of transistor current, switching frequency, and duty cycle, and determines the approximate temperature of each diode junction as a function of diode current and duty cycle. The information utilized to calculate approximate temperatures of the diodes and the transistors is set forth in the following table:

Vce vs. Ic: transistor conduction losses
   where Vce=collector/emitter voltage
   and Ic=collector current
Vec vs. Ic: diode conduction losses
   where Vec=emitter/collector voltage Eon vs. Ic: ON switching losses
where Eon=transistor turn-on energy
Eoff vs. Ic: OFF switching losses
where Eoff=transistor turn-off energy
Rtc: steady state thermal resistance from transistor to case
Rdc: steady state thermal resistance from diode to case
Zjc: normalized thermal transient response from either the transistor or the diode to the case
Rcs: steady state thermal resistance from case to heat sink
Zcs: normalized thermal transient response from case to heat sink All of the information except for the last item, Zcs, is information supplied by the manufacturer in the product specifications for the diode/transistor package. When the mounting configuration for the diode/transistor packages has been determined, the normalized thermal transient response from the case within the package to the heat sink (the rack or cabinet to which the case is fastened) must be measured to provide Zcs. The process by which temperatures are estimated is outlined in FIG. 3. The process may begin at an entry point 74 and will be repeated for all six transistor/diode pairs. This is established by first setting n equal to one in a step 75, and then a first subroutine 76 calculates the transistor switching loss, PTs. A subroutine 77 will calculate the transistor conduction loss, PTc, and then the losses are added together in a step 78 to provide the transistor power loss PT. A subroutine 83 calculates diode switching loss, PDs, and a subroutine 84 calculates diode conduction loss, PDc. Then the diode conduction loss is added to the diode switching loss to provide the diode power loss PD in a subroutine 85. A subroutine 87 calculates the power flow Ptjc from the transistor junction to the case as a function of the total transistor losses PT and the normalized thermal transient response from the transistor junction to the case, Zjc. A subroutine 89 calculates the power flow PDjc from the diode to the case as a function of total diode losses, PD and the normalized thermal transient response from the diode junction to the case, Zjc. Then a subroutine 91 calculates the total power flow Pjc from the devices to the case as the summation of the transistor to case power flow and the diode to case power flow. A subroutine 92 calculates the power flow Pcs from the case to the sink as a function of the total power flow provided in step 91, and the normalized thermal transient response from the case to the heat sink, Zcs.

Then the temperature rise between the transistor junction and the case TTjc is calculated as a function of the power flow from the transistor junction to the case, PTjc, times the thermal resistance, Rtc, from the transistor junction to the case, in a subroutine 93. A subroutine 94 provides the temperature differential between the diode junction and the case, TDjc, as a function of the power flow from diode to case, PDjc, times the thermal resistance from diode to case, Rdc. A subroutine 95 calculates the case-to-sink temperature use, Tcs, as a function of the case-to-sink power flow, Pcs, times the thermal resistance from case-to-sink, Rcs.

When temperature rises for a given package of transistor diode pair have been calculated, N is incremented in a step 102 and a test (not shown) determines if all six pairs in the switched bridge 11 have had temperature calculations. If not, the routine reverts to the subroutine 76 to calculate temperatures for the next transistor/diode pair. When temperature calculations are complete for all six transistor/diode pairs, the routine may end, or to revert to the step 75, depending on choice of implementation.

Figure 4:
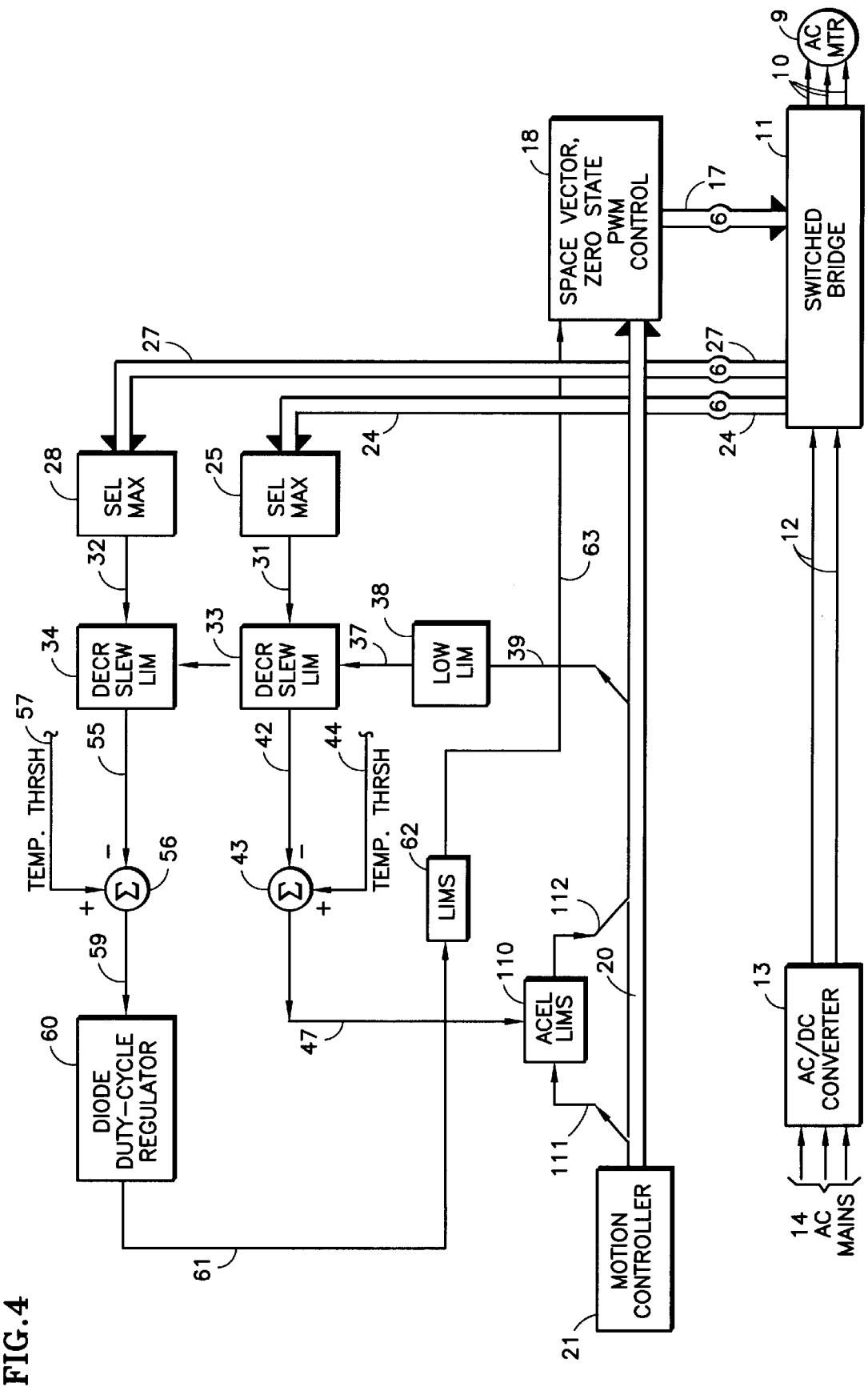
FIG. 4 is a high level functional diagram of an embodiment of the invention which utilizes measured transistor and diode temperatures to alter maximum commanded motor acceleration and to select zero states.

Referring to FIG. 4, instead of reducing the switching frequency in order to reduce transistor switching losses, the temperature of the warmest transistor may be utilized to limit the load on the motor. In FIG. 4, the signal on the line 47, indicative of the amount that the warmest transistor has exceeded the threshold, is applied to an acceleration limit function 110 which, when the signal 47 is present, will reduce the maximum acceleration command provided by the motion controller 21 on a line 111 to an acceptable, lower level maximum acceleration command on a line 112, that is applied to the PWM control 18 in the trunk of lines 20.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. A method of controlling thermal stress in a space vector, PWM, zero state regulator motor drive responsive to motor control commands to provide drive signals to a variable frequency motor, said motor drive having a transistor switch matrix in which the switching frequency is adjustable, each transistor having a junction and being in a combination with a corresponding anti-parallel diode having a junction, said motor drive incorporating selectable zero states in which no differential voltage is applied to the motor, comprising:

(A) determining the approximate transistor junction temperature of each of said transistors;

(B) comparing the approximate transistor junction temperature, of the one transistor having the highest one of said approximate transistor junction temperatures, to a predetermined transistor temperature threshold, and (a) if said highest approximate transistor junction temperature exceeds said transistor temperature threshold, altering the operation of said motor drive in a manner which will tend to lower switching losses in said transistors, but (b) if said highest approximate transistor junction temperature is less than said transistor temperature threshold, not altering the operation of said motor drive in a manner which will tend to lower switching losses in said transistors;

(C) determining the approximate diode junction temperature of each of said diodes; and (D) comparing the approximate diode junction temperature of the one diode having the highest one of said approximate diode junction temperatures to a predetermined diode threshold temperature, and (c) if said highest approximate diode junction temperature exceeds said diode threshold temperature, selecting a pattern of zero states involving a lower duty cycle of said one diode, but (d) if said highest approximate diode junction temperature is less than said diode threshold temperature, selecting a pattern of zero states involving lower switching losses in said transistors;
wherein said steps (A) and (C) comprise either (E) measuring the transistor junction temperature of each of said transistors and measuring the diode junction temperature of each of said diodes; or (F) determining, from manufacturer-supplied information concerning said transistor-diode combinations utilized in said motor drive, switching losses and conduction losses of said transistors, conduction losses of said diodes, a thermal resistance and a normalized transient thermal response between a case containing said combination and said junctions of said combination, and determining normalized transient thermal response between said case and a heat sink on which said case is disposed;

(G) providing a transistor model and a diode model, incorporating parameters determined in said step (F), respectively indicating (e) approximate temperature of one of said transistors as a function of transistor current, duty cycle, and switching frequency, and (f) approximate temperature of one of said diodes as a function of diode current and duty cycle;

(H) determining the approximate transistor junction temperature of each of said transistors by operating said transistor model for each of said transistors in response to current and duty cycle of said each transistor and switching frequency of said matrix; and (I) determining the approximate diode junction temperature of each of said diodes by operating said diode model for each of said diodes in response to current and duty cycle of said each diode.

2. A method of controlling thermal stress in a space vector, PWM, zero state regulator motor drive responsive to motor control commands to provide drive signals to a variable frequency motor, said motor drive having a transistor switch matrix in which the switching frequency is adjustable, each transistor having a junction and being in a combination with a corresponding anti-parallel diode having a junction, said motor drive incorporating selectable zero states in which no differential voltage is applied to the motor, comprising:

(A) determining the approximate transistor junction temperature of each of said transistors;

(B) comparing the approximate transistor junction temperature, of the one transistor having the highest one of said approximate transistor junction temperatures, to a predetermined transistor threshold temperature, and (a) if said highest approximate transistor junction temperature exceeds said transistor threshold temperature, altering the operation of said motor drive in a manner which will tend to lower switching losses in said transistors, but (b) if said highest approximate transistor junction temperature is less than said transistor threshold temperature, not altering the operation of said motor drive in a manner which will tend to lower switching losses in said transistors;

wherein said step (A) comprises either (C) measuring the transistor junction temperature of each of said transistors; or (D) determining, from manufacturer-supplied information concerning said transistor-diode combinations utilized in said motor drive, switching losses and conduction losses of said transistors, a thermal resistance and a normalized transient thermal response between a case containing said combination and said junctions of said combination, and determining a normalized transient thermal response between said case and a heat sink on which said case is disposed;

providing a transistor model incorporating parameters determined in said step (D), respectively indicating (e) approximate temperature of one of said transistors as a function of transistor current, duty cycle, and switching frequency; and determining the approximate transistor junction temperature of each of said transistors by operating said transistor model for each of said transistors in response to current and duty cycle of said each transistor and switching frequency of said matrix.

3. A method according to claim 2 further comprising:

(E) when the operation of said motor drive is being operated as altered in response to said highest approximate transistor junction temperature having exceeded said transistor threshold temperature, if said transistor threshold temperature exceeds said highest approximate transistor junction temperature, altering the operation of said motor drive in a manner which will tend to increase the switching losses in said transistors.

4. A method according to claim 3 further comprising:

(F) limiting the time rate of change of altering the operation of said motor drive in said steps (B) and (E).

5. A method according to claim 4 wherein said step (F) comprises limiting the time rate of change of altering the operation of said motor drive as a function of the motor speed.

6. A method according to claim 2 wherein said step of altering the operation of said motor drive comprises:

providing said motor control commands in which maximum acceleration is reduced in order to tend to lower switching losses in said transistors.

7. A method according to claim 2 wherein said step of altering the operation of said motor drive comprises:

decreasing the switching frequency in said motor drive in order to tend to lower switching losses in said transistors.

8. A method according to claim 2 wherein said step (B) comprises:

altering the operation of said motor drive in proportion with the amount by which said highest approximate transistor junction temperature exceeds said transistor temperature threshold.

9. A method of controlling thermal stress in a space vector, PWM, zero state regulator motor drive responsive to car motor control commands to provide drive signals to a variable frequency motor, said motor drive having a transistor switch matrix in which the switching frequency is adjustable, each transistor having a junction and being in a combination with a corresponding anti-parallel diode having a junction, said motor drive incorporating selectable zero states in which no differential voltage is applied to the motor, comprising:

(A) determining the approximate diode junction temperature of each of said diodes; and (B) comparing the approximate diode junction temperature of the one diode having the highest one of said approximate diode junction temperatures to a predetermined diode threshold temperature, and (c) if said highest approximate diode junction temperature exceeds said diode temperature threshold, selecting a pattern of zero states involving a lower duty cycle of said one diode, but (d) if said highest approximate diode junction temperature is less than said diode temperature threshold, selecting a pattern of zero states involving lower switching losses in said transistors;

wherein said step (A) comprises either (E) measuring the diode junction temperature of each of said diodes; or (F) determining, from manufacturer-supplied information concerning said transistor-diode combinations utilized in said motor drive, conduction losses of said diodes, a thermal resistance and a normalized transient thermal response between a case containing said combination and said junctions of said combination, and determining a normalized transient thermal response between said case and a heat sink on which said case is disposed;

(G) providing a diode model incorporating parameters determined in said step (F), respectively indicating temperature of one of said diodes as a function of diode current and duty cycle; and (H) determining the approximate diode junction temperature by operating said diode model for each of said diodes in response to current and duty cycle of said each diode.

10. A method according to claim 9 wherein said step B comprises:

lowering the duty cycle of said one diode in proportion to the amount by which said highest approximate diode junction temperature exceeds said diode temperature threshold.

11. A method of determining transistor and diode temperatures in a space vector, PWM, zero state regulator motor drive responsive to motor control commands to provide drive signals to a motor, said motor drive having a transistor switch matrix in which the switching frequency is adjustable, each transistor having a junction and being in a combination with a corresponding anti-parallel diode having a junction, comprising:

(A) determining, from manufacturer-supplied information concerning said transistor-diode combinations utilized in said motor drive, switching losses and conduction losses of said transistors, conduction losses of said diodes, a thermal resistance and a normalized transient thermal response between a case containing said combination and said junctions of said combination, and determining normalized transient thermal response between said case and a heat sink on which said case is disposed;

(B) providing a transistor model and a diode model, incorporating parameters determined in said step (A), respectively indicating (a) approximate temperature of one of said transistors as a function of transistor current, duty cycle, and switching frequency, and (b) approximate temperature of one of said diodes as a function of diode current and duty cycle;

(C) determining the approximate transistor junction temperature of each of said transistors by operating said transistor model for each of said transistors in response to current and duty cycle of said each transistor and switching frequency of said matrix; and (D) determining the approximate diode junction temperature of each of said diodes by operating said diode model for each of said diodes in response to current and duty cycle of said each diode.

12. A method of determining transistor temperatures in a space vector, PWM, zero state regulator motor drive responsive to motor control commands to provide drive signals to a motor, said motor drive having a transistor switch matrix in which the switching frequency is adjustable, each transistor having a junction and being in a combination with a corresponding anti-parallel diode having a junction, comprising:

(A) determining, from manufacturer-supplied information concerning said transistor-diode combinations utilized in said motor drive, switching losses and conduction losses of said transistors, a thermal resistance and a normalized transient thermal response between a case containing said combination and said junctions of said combination, and determining normalized transient thermal response between said case and a heat sink on which said case is disposed;

(B) providing a transistor model incorporating parameters determined in said step (A), respectively indicating (a) approximate temperature of one of said transistors as a function of transistor current, duty cycle, and switching frequency; and (C) determining the approximate transistor junction temperature of each of said transistors by operating said transistor model for each of said transistors in response to current and duty cycle of said each transistor and switching frequency of said matrix.

13. A method of determining diode temperatures in a space vector, PWM, zero state regulator motor drive responsive to motor control commands to provide drive signals to a motor, said motor drive having a transistor switch matrix in which the switching frequency is adjustable, each transistor having a junction and being in a combination with a corresponding anti-parallel diode having a junction, comprising:

(A) determining, from manufacturer-supplied information concerning said transistor-diode combinations utilized in said motor drive, conduction losses of said diodes, a thermal resistance and a normalized transient thermal response between a case containing said combination and said junctions of said combination, and determining normalized transient thermal response between said case and a heat sink on which said case is disposed;

(B) providing a diode model, incorporating parameters determined in said step (A), respectively indicating approximate temperature of one of said diodes as a function of diode current and duty cycle; and (C) determining the approximate diode junction temperature of each of said diodes by operating said diode model for each of said diodes in response to current and duty cycle of said each diode.

\* \* \* \* \*